United States Patent

Theriot et al.

[11] Patent Number: 5,954,381
[45] Date of Patent: Sep. 21, 1999

[54] APPARATUS AND METHOD FOR CONNECTING BED RAILS TO TRUCK BOXES

[76] Inventors: Daniel Paul Theriot, 213 Gemini Dr., Houma, La. 70360; Barry Alan Benoit, 114 Mona Kay La., Houma, La. 70364

[21] Appl. No.: 08/992,360

[22] Filed: Dec. 17, 1997

[51] Int. Cl.$^6$ ............................................. B60R 9/00
[52] U.S. Cl. ........................... 296/37.6; 296/32; 224/404; 410/106
[58] Field of Search .................. 296/32, 37.6, 41; 224/309, 404, 405; 410/106, 110, 108

[56] References Cited

U.S. PATENT DOCUMENTS

| | | | |
|---|---|---|---|
| 3,664,704 | 5/1972 | Ellis | 224/405 |
| 4,673,119 | 6/1987 | Bott | 224/309 |
| 5,642,971 | 7/1997 | Ragsdale | 410/101 |

Primary Examiner—Dennis H. Pedder
Attorney, Agent, or Firm—Mau & Krull, P.A.

[57] ABSTRACT

An adapter for connecting a bed rail to a truck box includes a mounting block (10) having a threaded mounting fastener aperture (15). The mounting block (10) also includes a groove (12) which has a configuration which matches that of the cross sectional configuration of the bed rail (30). A threaded bed rail bore (13) is positioned in the block (10) to allow a set screw (14) to firmly hold the bed rail (30) after is has been inserted into the mounting block (10). The mounting block (10) is secured to the storage box (10) by means of a threaded bolt which is inserted through a mounting fastener opening (22) in the mounting section (20a) of the storage box (20). The bolt goes through the storage box (20) mounting block (10) and is held in position by a nut (80).

18 Claims, 3 Drawing Sheets

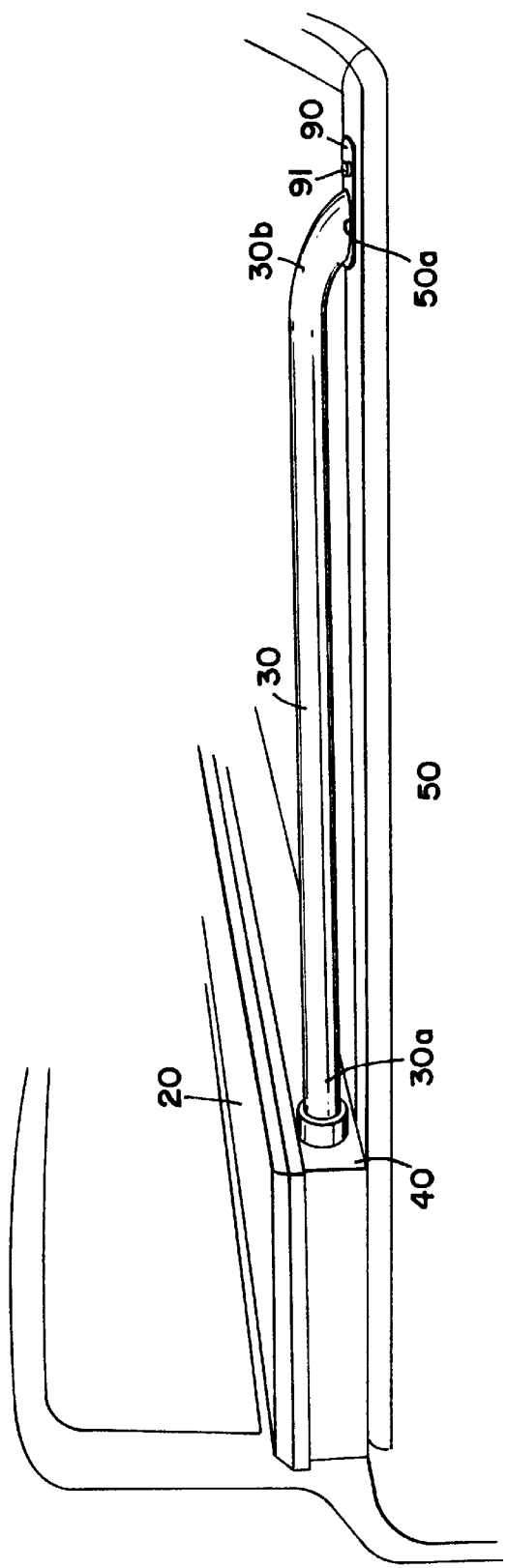

APPARATUS AND METHOD FOR CONNECTING BED RAILS TO TRUCK BOXES

BACKGROUND OF THE INVENTION

1. Field of the Invention

This invention relates generally to the installation of bed rails to trucks and more particularly to trucks that have boxes or storage compartments attached to the bed of the truck.

2. Description of the Prior Art

Bed rails are often installed to the body of trucks to give the appearance of a sports vehicle. Typically, there are stake holes that are provided in the truck and the bed rails are installed from one stake hole to another stake hole. However, trucks are often used as a work vehicle and tool boxes or other storage boxes are placed in the bed of the pickup truck adjacent to the cab. It then becomes difficult to attach the first end of the bed rail which is proximate to the cab. It is desired to attach the bed rail to the work box. However to date, there is no easy method of doing so. Therefore, there is a need to provide for a method and connector for securing the bed rail to the storage box. When used in this application, the term storage box may refer to any number of storage products such as truck boxes, tool boxes etc.

SUMMARY OF THE INVENTION

The present invention is an adapter to connect a bed rail to a truck storage box, the bed rail having a given cross sectional configuration. The truck box has a mounting section and a mounting fastener opening formed therein. The adapter includes a mounting block having a mounting surface and a bed rail connecting surface. The mounting surface is adapted to be adjacent the mounting section. A mounting fastener aperture is adapted to be in general alignment with the opening. A groove is formed in the mounting block and has a configuration which matches the cross sectional configuration of the bed rail, wherein the bed rail is set in the groove. The mounting fastener aperture is adapted to receive a fastener to fasten the block to the box.

In another embodiment, the invention is an adapter to connect a bed rail to a truck storage box, the bed rail having a given cross sectional configuration. The truck box has a mounting section and a mounting fastener opening formed therein. The adapter includes a mounting block having a mounting surface and a bed rail connecting surface. The mounting surface is adapted to be adjacent the mounting section. A mounting fastener aperture is adapted to be in general alignment with the opening. A groove is formed in the mounting block and has a configuration which matches the cross sectional configuration of the bed rail, wherein the bed rail is set in the groove. The adapter includes means to fasten the block to the bar and another means for securing the bed rail in the groove.

In another embodiment, the invention is a method of installing a bed rail having a given cross sectional configuration to a truck having a storage box installed. The method comprises forming a fastener opening in a mounting section of the storage box. Mounting a block to the mounting section by using a fastener through the fastener opening and connecting the fastener to the block. Then, inserting a first end of the bed rail into a groove formed in the mounting block, the groove having a matching shape to that of the bed rail. The second end of the bed rail is fastened to a stake pocket in the truck and the first end of the bed rail is secured in the block.

In another embodiment, the invention is a combination bed rail and an adapter for mounting to a truck having a storage box with a mounting section and a truck body. The combination includes a bed rail having first and second ends, the first end of the bed rail having a given cross sectional configuration. The second end of the bed rail is adapted to be connected to the truck body by conventional means. A mounting block has a mounting surface and a bed rail connecting surface. The mounting surface is adapted to be adjacent the mounting section. A mounting fastener aperture is adapted to be in general alignment with the opening. A groove is formed in the mounting block, the groove has a configuration matching the cross sectional configuration of the bed rail, wherein the bed rail is set in the groove. The combination also includes a fastener to fasten the block to the box.

BRIEF DESCRIPTION OF THE DRAWINGS

FIG. 5 is a perspective view showing a bed rail connected to a truck using the adapter of the present invention.

DETAILED DESCRIPTION OF THE PREFERRED EMBODIMENT

Figure 1:
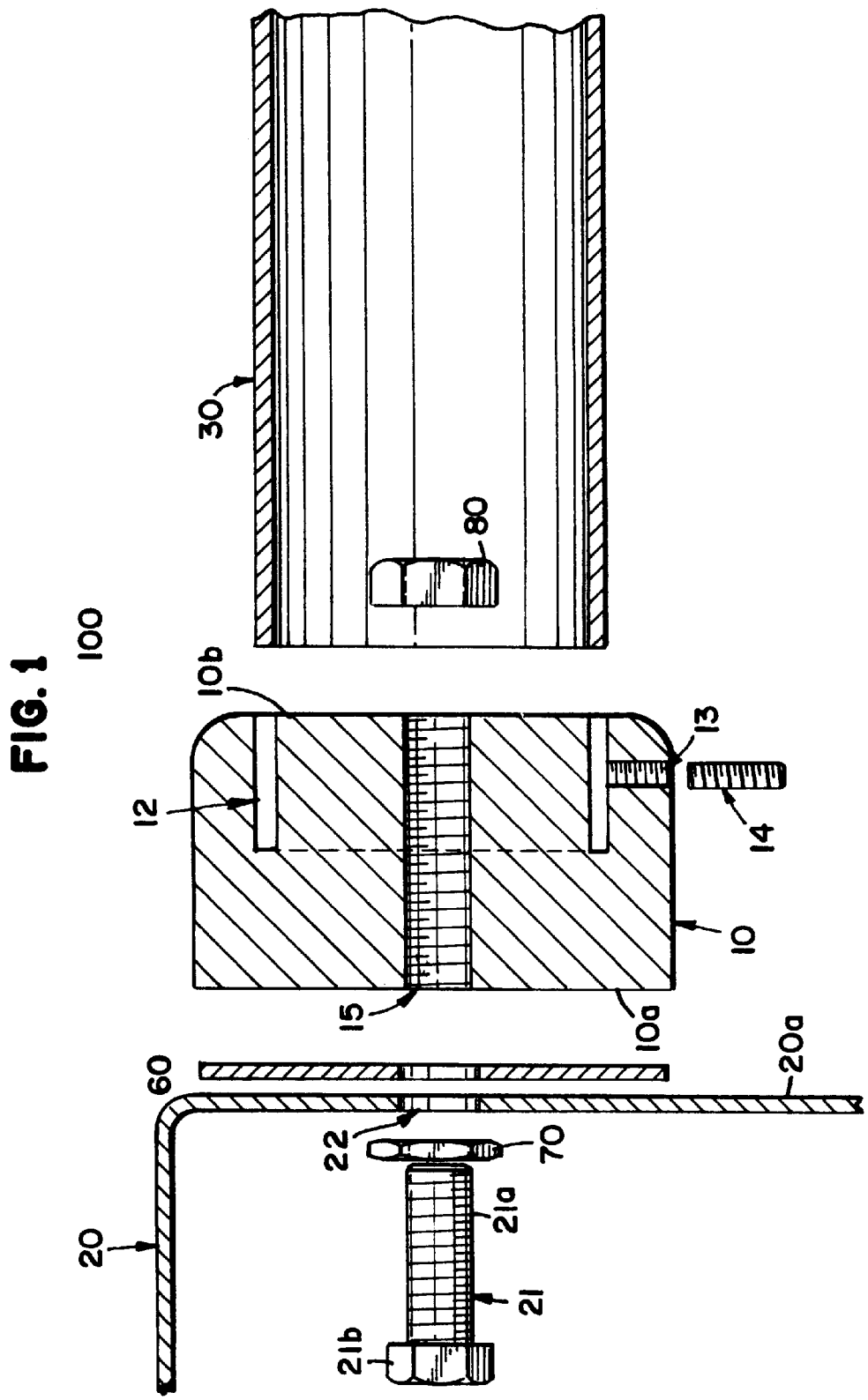
FIG. 1 is an exploded perspective view of the storage box, adapter and bed rail of the present invention.
Figure 4:
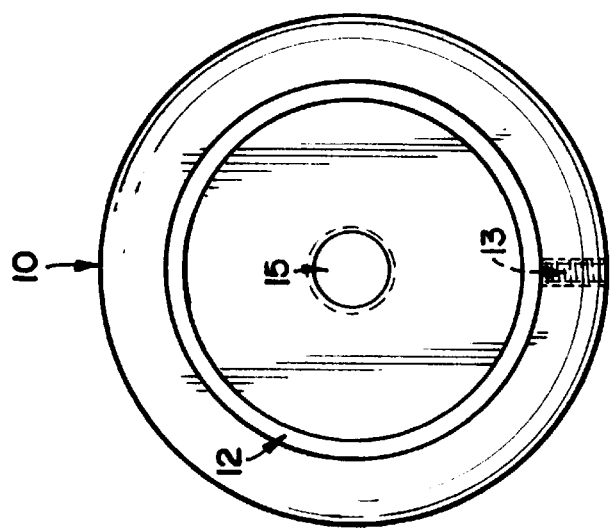
FIG. 4 is a front elevational view of the block shown in FIG. 2.
Figure 3:
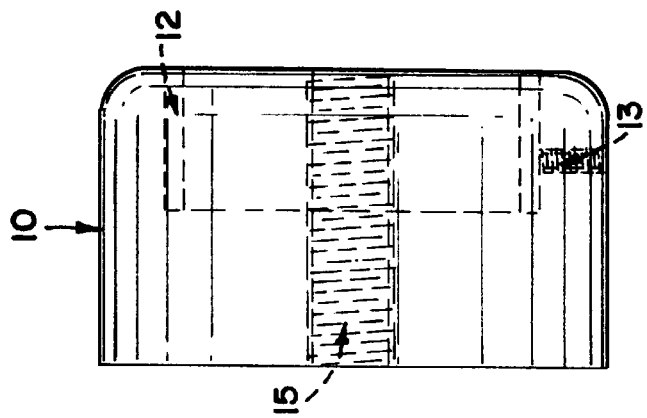
FIG. 3 is a side elevational view of the block shown in FIG. 2.
Figure 2:
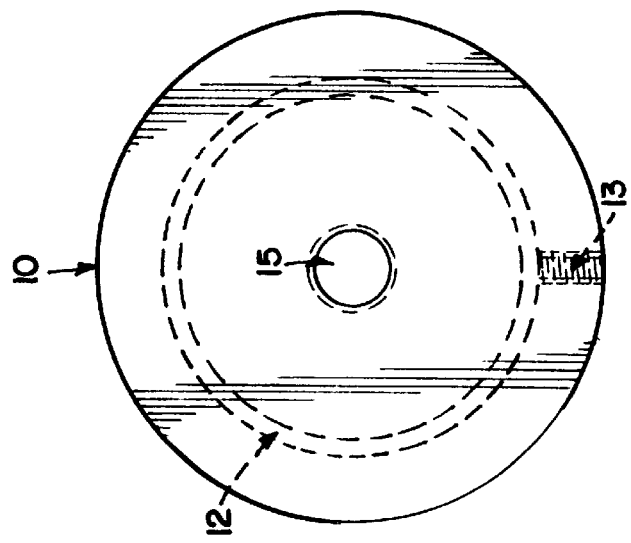
FIG. 2 is a back elevational view of the block shown in FIG. 1.

Referring to the drawings wherein like numerals represent parts throughout the several views, there is generally disclosed an adapter 100. FIG. 5 is a perspective view of a bed rail installed on a pickup truck. The pickup truck has a storage box 20 which is installed into the pickup in a manner consistent with the manufacturer's instructions. The storage box 20 may be one of many storage boxes available. The storage box 20 is resting on the bed (not shown) of the pickup. The pickup or truck has a sidewall 50. The storage box 20 has an end portion 40 which typically extends over the sidewall 30. Further, a bed rail 30 is installed between the storage box 20 and the end of the sidewalls 50. The sidewalls 50 have stake holes 50a, which will be described more fully hereafter. While not shown, another bed rail is installed on the other side of the truck Referring now to FIGS. 1 through 4, the adapter 100 includes a mounting block 10 which may be constructed from any suitable material, such as stainless steel. The mounting block is preferably solid. However, it is recognized that other configurations may be used which would create voids to lighten the overall weight. The mounting block 10 has a threaded mounting fastener aperture 15 which extends through the block. A groove 12 is formed in the bed rail connecting surface 10b. The mounting fastener aperture 15 extends from the mounting surface 10a to the bed rail connecting surface 10b. A threaded bed rail bore 13 is formed generally perpendicular to the groove 12. The groove 12 may be any suitable depth. The depth is typically from ½ to ⅜ of an inch. The groove 12 is shown as being circular. However, it is understood that the groove may take on many configurations such as rectangular, square, half-round etc. The groove 12 has a configuration which matches the cross-sectional configuration of the bed rail 30. The bed rail 30 is typically a hollow pipe and has a cross sectional configuration, as shown, which is circular and is matched to the configuration of the groove 12 such that the bed rail 30 will fit into the groove 12. A gasket 60 is provided which forms a seal between the mounting block 10 and the mounting section 20a of the tool box 20. The block 10 is mounted to the tool box 20 by means of a threaded bolt 21 having a threaded end 21a and a head 21b, a washer 70 and nut 80. A mounting fastener opening 22 is formed in the mounting section 20a of the tool box 20. The opening 22 is in general alignment with the aperture 15.

The storage box 20 is installed in the truck such that the storage box 20 rests on the bed of the truck. The box 20 is installed as described by the manufacturer of the box 20. Opening 22 is formed in the box 20 so that the opening 22 is in alignment with the stake pocket. The block 10 is secured to the box 20 by bolt 21 (through aperture 15), nut 70 and gasket 60. The gasket 60 insures a water tight seal. The bed rail 30 has a first end 30a and a second end 30b. The bed rail 30 is cut to the appropriate size by any suitable means such as a hacksaw. The length is determined by the distance between the stake hole 50a and the distance to the block 10. The rail 30 is cut an additional length to allow for the insertion into the groove 12. Typically this would be an additional ⅝ of an inch (the depth of the groove). The second end 30b is inserted into the stakehole 50a and secured by means of a plate 90 and bolt 91. However, it is understood that any suitable conventional means may be used. The set screw 14 is then threaded into the bore 13 and the end of the set screw 14 contacts the bed rail 30 in the groove 12, thereby firmly securing the bed rail in position.

As can be seen, the present invention provides for a simple apparatus and method which securely connects a bed rail 30 to a storage box 20. Therefore one is able to have a working vehicle with storage box and still have the sporty look of the bed rails. The present invention does not require any modification of the storage box other than simply drilling one hole, namely the mounting fastener opening 22.

Other modifications of the invention will be apparent to those skilled in the art in light of the foregoing description. This description is intended to provide specific examples of individual embodiments which clearly disclose the present invention. Accordingly, the invention is not limited to these embodiments or the use of elements having specific configurations and shapes as presented herein. All alternative modifications and variations of the present invention which follow in the spirit and broad scope of the appended claims are included.

We claim:

1. An adapter to connect a bed rail to a truck storage box, the bed rail having a given cross-sectional configuration, the box having a mounting section and a mounting fastener opening formed therein, the adapter comprising:
   (a) a mounting block having a mounting surface and a bed rail connecting surface, the mounting surface adapted to be adjacent the mounting section;
   (b) a mounting fastener aperture, the aperture adapted to be in general alignment with the opening;
   (c) a groove formed in the mounting block having a configuration matching the cross-sectional configuration of the bed rail, wherein the bed rail is set in the groove; and
   (d) the mounting fastener aperture adapted to receive a fastener to fasten the block to the box.

2. The adapter of claim 1, wherein the groove is circular.
3. The adapter of claim 1, wherein the block has a side surface generally parallel to the groove and a bore is formed between the side surface and the groove.
4. The adapter of claim 3, further comprising a securing device positioned in the bore to secure the bed rail to the block.
5. The adapter of claim 4, wherein the bore is threaded and the securing device is a set screw.
6. The adapter of claim 5, further comprising a gasket positioned between the mounting section and the mounting surface.
7. An adapter to connect a bed rail to a truck storage box, the bed rail having a given cross-sectional configuration, the box having a mounting section and a mounting fastener opening formed therein, the adapter comprising:
   (a) a mounting block having a mounting surface and a bed rail connecting surface, the mounting surface adapted to be adjacent the mounting section;
   (b) a mounting fastener aperture, the aperture adapted to be in general alignment with the opening;
   (c) a groove formed in the mounting block having a configuration matching the cross-sectional configuration of the bed rail, wherein the bed rail is set in the groove;
   (d) means to fasten the block to the box; and
   (e) means for securing the bed rail in the groove.
8. The adapter of claim 7, wherein the groove is circular.
9. A method of installing a bed rail having a given cross-sectional configuration to the truck having a storage box installed, comprising:
   (a) forming a fastener opening in a mounting section of the storage box;
   (b) mounting a mounting block to the mounting section by using a fastener through the fastener opening and connecting the fastener to the block;
   (c) inserting a first end of the bed rail into a groove formed in the mounting block, the groove having a matching shape to that of the bed rail;
   (d) fastening a second end of the bed rail to a stake pocket in the truck; and
   (e) securing the first end of the bed rail in the block.
10. The method of claim 9, wherein the mounting block has a threaded aperture and a bolt is used to mount the block to the box.
11. The method of claim 10, wherein the mounting block has a threaded bore and a set screw is inserted in the threaded bore to secure the bed rail.
12. A combination bed rail and adapter for mounting to a truck having a storage box with a mounting section and a truck body, comprising:
   (a) a bed rail having first and second ends, the first end of the bed rail having a given cross-sectional configuration;
   (b) a second end for connecting to the truck body;
   (c) a mounting block having a mounting surface and a bed rail connecting surface, the mounting surface adapted to be adjacent the mounting section;
   (d) a mounting fastener aperture, the aperture adapted to be in general alignment with the opening;
   (e) a groove formed in the mounting block having a configuration matching the cross-sectional configuration of the bed rail, wherein the bed rail is set in the groove; and (f) a fastener to fasten the block to the box.

13. The combination of claim 12, wherein the groove is circular.

14. The combination of claim 12, wherein the mounting block has a threaded aperture and the fastener is a threaded bolt.

15. The combination of claim 14, wherein the block has a side surface generally parallel to the groove and a bore is formed between the side surface and the groove.

16. The combination of claim 15, further comprising a securing device positioned in the bore to secure the bed rail to the block.

17. The combination of claim 16, wherein the bore is threaded and the securing device is a set screw.

18. The combination of claim 17, further comprising a gasket positioned between the mounting section and the mounting surface.

* * * * *